United States Patent [19]

Gerling

[11] Patent Number: 4,636,095
[45] Date of Patent: Jan. 13, 1987

[54] HYDRODYNAMIC PLAIN BEARING

[75] Inventor: Paul Gerling, Oberhausen, Fed. Rep. of Germany

[73] Assignee: Glyco-Metall-Werke Daelen & Loos GmbH, Wiesbaden, Fed. Rep. of Germany

[21] Appl. No.: 756,765

[22] Filed: Jul. 18, 1985

[30] Foreign Application Priority Data

Jul. 19, 1984 [DE] Fed. Rep. of Germany ....... 3426613
Jun. 20, 1985 [DE] Fed. Rep. of Germany ....... 3522037

[51] Int. Cl.⁴ ........................ F16C 32/06; F16C 17/03
[52] U.S. Cl. ..................................... 384/117; 384/99; 384/114
[58] Field of Search ................... 384/99, 100, 114–120, 384/154–156, 302, 309–312

[56] References Cited

U.S. PATENT DOCUMENTS 2,937,240 5/1960 Harker ............................ 384/114 X
3,610,711 10/1971 Mierley, Sr. ........................ 384/311
3,675,977 7/1972 Arsenius et al. ..................... 384/117
3,944,304 3/1976 Purtschert ........................... 384/117
3,972,572 8/1976 Hohn .................................. 384/312
4,490,054 12/1984 Kimmelaar .......................... 384/117

FOREIGN PATENT DOCUMENTS 0023657 5/1983 European Pat. Off. .
2709048 9/1978 Fed. Rep. of Germany .
2040798 12/1982 Fed. Rep. of Germany .

Primary Examiner—Stuart S. Levy
Assistant Examiner—Thomas R. Hannon
Attorney, Agent, or Firm—Karl F. Ross; Herbert Dubno

[57] ABSTRACT

In a plain bearing, at least one adapter segment is used which includes a bearing body cooperating with an adapter piston to define a pressure chamber therebetween. The pressure chamber is connected with the lubricant gap extending between the plain surface of the bearing body and the shaft to be supported so that the pressure as exerted by the shaft and prevailing in the lubricant gap is deviated to the pressure chamber so that oscillations of the shaft can be automatically controlled.

8 Claims, 4 Drawing Figures

HYDRODYNAMIC PLAIN BEARING

FIELD OF THE INVENTION

My present invention relates to a hydrodynamic sliding bearing, especially a radial or journal bearing. More particularly, the invention relates to hydrodynamic plain bearings, i.e. bearings without roller or ball element and also known as sliding bearings, including at least one bearing segment for radial support of shafts in particular high-speed journals, primarily for turbine-sets with automatic adjustment of the bearing play and lubricant film.

BACKGROUND OF THE INVENTION

It has turned out in practice that the main problem of existing hydrodynamic bearings for turbo-sets are the oscillations of the shaft at high rotational speed which usually cannot be controlled by using known two-face plain bearings or multi-face plain bearings.

The hydrodynamic bearings hitherto used for turbo-sets have been relatively complicated and very expensive. Nevertheless, the oscillations generated by the shaft can only be controlled to a limited degree.

OBJECTS OF THE INVENTION

It is the principal object of my invention to provide an improved hydrodynamic plain bearing obviating the afore-stated drawbacks.

A more specific object is to provide an improved hydrodynamic bearing capable of automatically compensating the lubricant or gap width and thereby controlling such oscillations.

SUMMARY OF THE INVENTION

I realize this object according to the present invention by providing at least one compensating or adapter segment including a bearing body which defines with the shaft to be supported a lubricant gap and is provided with a stressing piston which defines therewith a pressure chamber connected to the lubricant gap via a supply channel so that the hydrodynamic pressure created in the lubricating film within the gap is directed into the pressure chamber and applied to the tensioning piston.

Through the provision of such an adapter segment, the thickness of the lubricating film remains essentially constant regardless of the operational parameters like e.g. specific load, magnitude of the rotational (peripheral) speed, viscosity of the lubricant or thermal expansion. The control of the oscillations of the shaft is automatically provided by the piston which absorbs the pressure within the lubricant gap without necessitating any additional control devices.

More specifically the segments defining the lubricant gap have bearing surfaces curved to correspond to the shaft and juxtaposed therewith in defining the gap. The segments are limitedly movable in radial direction, e.g. can rock, so that the film thickness would vary with change in the aforementioned parameters.

At least one of these segments is provided with the improved means of this invention for automatically controlling the thickness to maintain it constant in spite of hydrodynamic pressure buildup in the gap. This means includes a piston in the adapter segment which bears upon the surrounding housing and defines a compartment within the segment which is pressurized from the gap by a passage in the segment communicating between the compartment and the gap and extending through the bearing surface of the segment. As pressure increases in the gap, the pressure increase is applied to the compartment and acts upon the piston to urge the latter generally radially against the surrounding housing. The reaction force closes the gap to compensate for the increase which results from the pressure buildup.

Thus the width of the lubricating film at the adapter segment is controlled by a pressure balance automatically built-up between the action force within the lubricant gap and the reaction force at the stressing piston. Thus, influences by changing operational parameters are effectively compensated in a simple manner.

As no exacting tolerances are required, the adapter segment according to the invention can easily and inexpensively be incorporated in hydrodynamic plain bearings of simple design—as multiface plain bearings—but also of more complicated design—as plain bearings with tiltable or rocking bearing segments.

BRIEF DESCRIPTION OF THE DRAWING

The above and other objects, features and advantages of my present invention will now be described in more detail with reference to the accompanying drawing in which.

SPECIFIC DESCRIPTION

Figure 1:
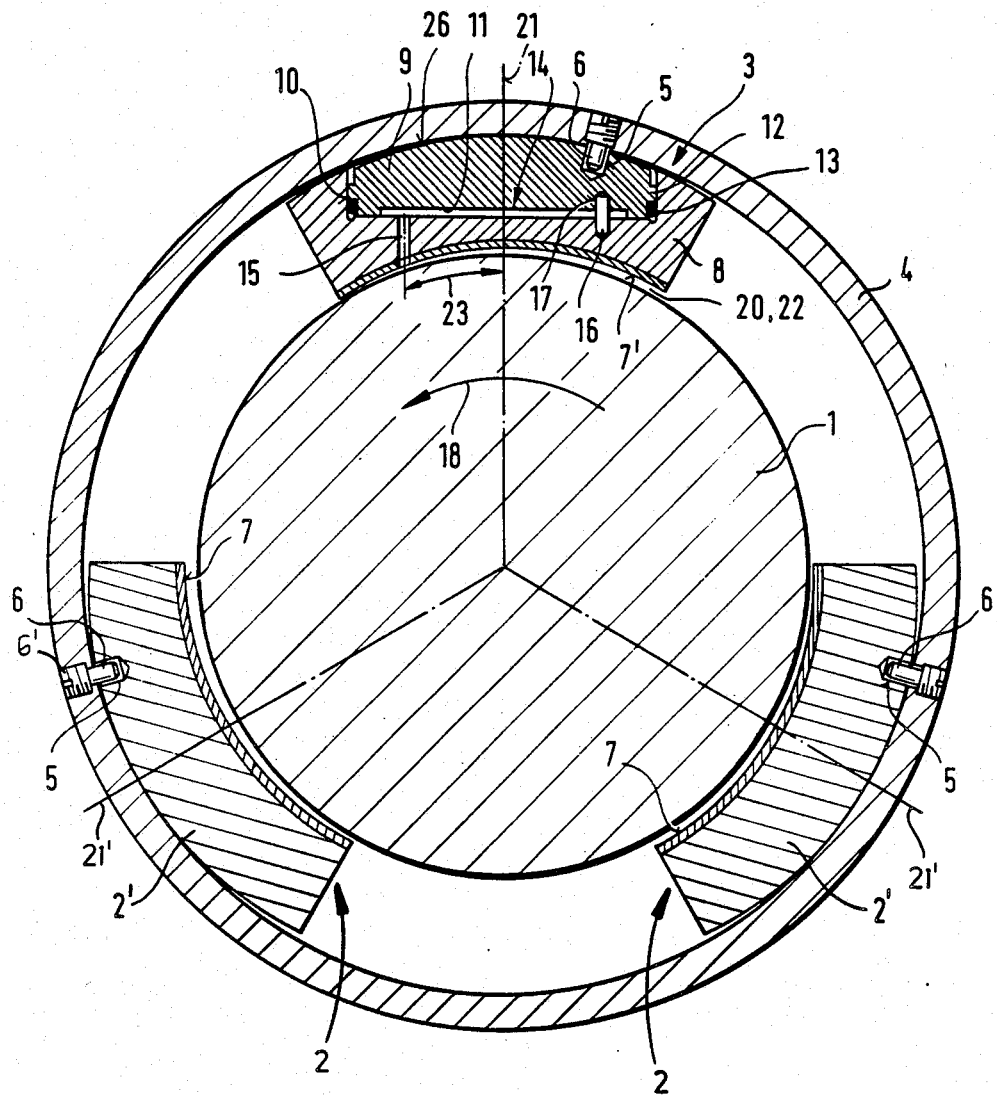
FIG. 1 is a cross sectional view of a plain bearing according to the invention.

In the drawing, I have shown a tilting segment or rocking segment plain bearing generally designated by reference numeral 30 for supporting a rotating shaft 1. The plain bearing 30 includes two ordinary bearing segments 2 and a adapter segment 3 spaced about the journal of the shaft 1. The bearing segments 2 which are of conventional design include a curved bearing body 2' which is fixed to a retainer ring 4 in such a manner that the bearing segment 2 is tiltable, i.e. can rock, along its top portion 25 about the center line 21'. The positioning connection between the retainer ring 4 and each bearing segment 2 is provided via a positioning pin 6 which protrudes a through-hole 6' in the ring 4 and projects with clearance into a blind hole 5 of the body 2'. Applied on the surface facing the shaft 1, the body 2' of each bearing segment 2 is provided with a plain surface 7 whose contour is essentially adapted to the circumference of the journal of the shaft 1.

Figure 2:
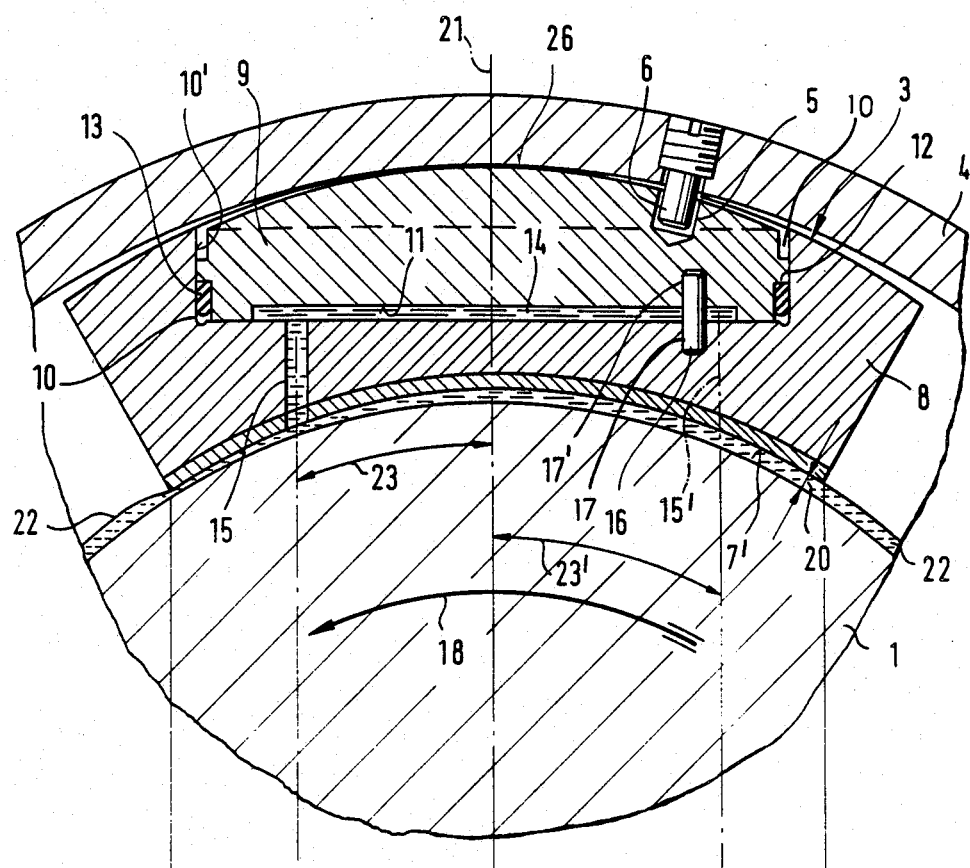
FIG. 2 is a detailed section of the plain bearing of FIG. 1 illustrating an adapter segment.

Turning now in particular in FIG. 2, it may be seen that the adapter segment 3 includes a curved bearing body 8 which is connected to the retainer ring 4 in the same manner as the bearing segments 2 that is via a positioning pin 6 projecting with clearance into a blind bore 5 and is provided with a spherical or cylindrical top portion 25 so as to be tiltable about its center line 21. The bearing body 8 has a plain surface 7' extending at a distance to the journal of the shaft 1 to define a lubricant gap 20 therebetween. At its face opposing the retainer ring 4, the bearing body 8 is provided with a recess 10' so that the body 8 and the surrounding retainer ring 4 define a chamber 10 in which a stressing or adapter piston 9 is accommodated.

The piston 9 has a top portion 26 with preferably spherical surface facing the retainer ring 4 and is provided with a recess 11 along its surface facing away from the retainer ring 4 to define with the bearing body 8 a pressure chamber 14. Connecting the pressure chamber 14 with the lubricant gap 20 is a connection or supply channel 15 or 15' which is arranged at an eccentric location with respect to the center line 21. As will be explained hereinafter, in the present embodiment, the adapter segment 3 is provided with the channel 15 at the left-hand side. It is however, also possible to arrange a channel at the right-hand side as indicated by dot-dash line 15'.

Figure 3:
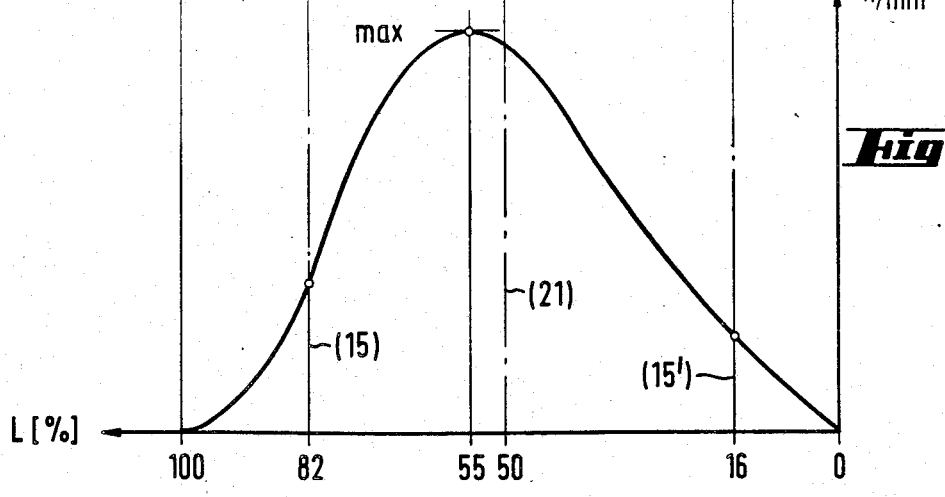
FIG. 3 is a diagram illustrating the pressure gradient along the entire length of a lubricant gap and showing the effect of two possible positions of the passage along the length of the gap.
Figure 4:
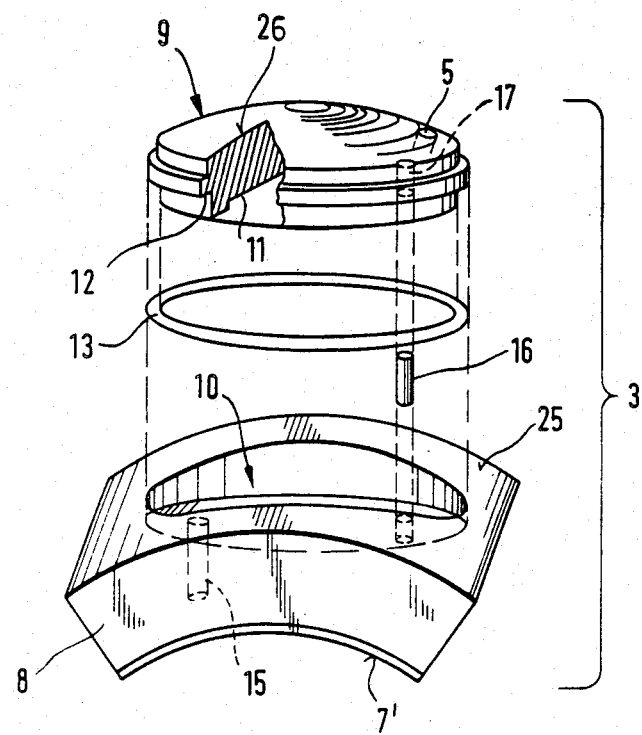
FIG. 4 is a perspective exploded view of the adapter segment.

FIG. 3 illustrates the graph of the hydrodynamic pressure in the lubricant gap 20 along its length L.

Accordingly, the hydrodynamic pressure increases from the initial area of the lubricant gap 20 to a maximum value at about the center 21 of the plain surface 7' and then drops again at the end area of the gap 20. Considering the gradient of the hydrodynamic pressure, the channel 15 is advantageously arranged in the zone of the pressure drop or alternatingly as channel 15' in the zone of the pressure build-up of the lubricant gap 20 when defining the rotation of the shaft 1 in direction of arrow 18.

Although the position of the channel 15 or 15' is certainly dependent on the respective geometry of the lubricant gap 20, on the dimension of the stressing piston 9 and on the requisite width of the gap 20, it is preferred to provide the channel 15 or 15' at a distance 23 or 23' from the center 21 of at least 10% maximal 40% of the entire length of the plain surface 7'. For example, as illustrated in FIGS. 2 and 3, the distance 23 to the center 21 (corresponding to 50% of the gap length L) amounts to 32% as the channel 15 is located at about 82% of the length L thus rendering its eccentricity at 32% off-center because 82% minus 50% equals 32%. The channel 15 thus extends in the area of high pressure drop.

In case, it is desired to arrange the channel in the area of pressure build-up as indicated at the right-hand side of FIGS. 2 and 3, the distance 23' of channel 15' is about 34% off center 21 and is thus arranged at 16% of the length L of gap 20.

In order to avoid oscillations of the piston 9, the reaction speed should be kept to a minimum. The so-desired inertia of the piston 9 is obtained by keeping the cross section of the channels 15 or 15' to a maximum of 5% of the plain surface 7' of the adapter segment 3.

The piston 9 is connected in a rotation-fixed manner to the bearing body 8 via a positioning pin 16 which extends in aligned boreholes 17, 17' provided in the piston 9 and bearing body 8, respectively. In order to prevent leaking of lubricant 22 out of the pressure chamber 14, the piston 9 is provided with a laterally projecting circumferential flange portion 12 which abuts the bearing body 8. Thus, an annular space 19 is formed in which a sealing ring 13 is accommodated and supported by the flange 12.

Once the shaft 1 is caused to rotate, the lubricant is entrained by the journal into the lubricating film 22 and a hydrodynamic pressure is automatically built-up within the film in the gap 20 to allow the journal to float and to carry the load applied to it. The increase of the hydrodynamic pressure forces lubricant to flow through the channel 15 into the pressure chamber 14 until the latter is filled and a pressure balance is automatically obtained between the pressure in the lubricant gap 20 and the pressure chamber 14 i.e. at both sides of the bearing body 8. Consequently, by connecting the lubricant gap 20 with the pressure chamber 14, the acting force in the gap 20 is automatically offset by the reacting force from the stressing piston 9 which thus absorbs the pressure from the lubricant gap 20 to control oscillations of the shaft 1.

The invention is not limited to the use of liquid lubricants; rather, gaseous lubricants as e.g. air can be utilized as well. Moreover, it is certainly within the scope of the invention to use more than one adapter segment 3 which may be arranged radially as well as axially and may comprise more than one stressing piston 9.

I claim:

1. A plain bearing for supporting a shaft having a cylindrical surface, comprising:

a plurality of members spaced apart from one another and juxtaposed with said shaft for supporting same in said bearing and having at least one adapter segment including an arc-segmental bearing body formed with a curved surface which defines a lubricant gap with the cylindrical surface of said shaft, and reacting means for absorbing the pressure within said lubricant gap and defining with said bearing body a pressure chamber at a radial distance from said lubricant gap, said bearing body being provided with a bearing-body recess, said reacting means including an adapter piston received in said bearing-body recess and provided with a further recess facing said bearing body and defining said chamber;

connecting means for providing a communication between said pressure chamber and said lubricant gap for allowing pressure within said lubricant gap to be diverted to said pressure chamber and to be absorbed by said reacting means;

a housing spaced from said shaft, said piston and said members being braced generally radially against said housing by hydrodynamic pressure in gaps between said members and shaft and between said curved surface and said shaft, said adapter piston being provided with a circumferential flange portion to define an annular space with said bearing body; and a sealing ring accommodated within said space and abutting against said flange portion.

2. A plain bearing as defined in claim 1 wherein said connecting means is a supply channel extending in said bearing body between said lubricant gap and said pressure chamber.

3. A plain bearing as defined in claim 2 wherein said bearing body defines a center line and has a plain surface forming said arcuate surface which faces said lubricant gap, said supply channel being arranged eccentric with respect to said center at a distance therefrom.

4. A plain bearing as defined in claim 3 wherein said plain surface has a predetermined length, said distance of said supply channel from said center being at least 10% and a maximum of 40% of said length of said plain surface.

5. A plain bearing as defined in claim 3 wherein said supply channel has a cross-section of maximal 5% of said plain surface.

6. A plain bearing as defined in claim 1 wherein said adapter piston and said bearing body are each provided with a top portion to render said adapter segment tiltable about its center.

7. A plain bearing as defined in claim 6 wherein said top portion of said piston and said bearing body have a generally spherical shape.

8. A plain bearing as defined in claim 6 wherein said top portion of said piston and said bearing body have a generally cylindrical shape.

* * * * *